(12) United States Patent
Weiss

(10) Patent No.: US 6,907,777 B2
(45) Date of Patent: Jun. 21, 2005

(54) APPARATUS AND METHOD FOR ELECTRONIC TIRE TESTING

(75) Inventor: Arnold A. Weiss, 3141 Dean Ct., #803, Minneapolis, MN (US) 55416

(73) Assignee: Arnold A. Weiss, Minneapolis, MN (US)

(*) Notice: Subject to any disclaimer, the term of this patent is extended or adjusted under 35 U.S.C. 154(b) by 44 days.

(21) Appl. No.: 10/407,636

(22) Filed: Apr. 4, 2003

(65) Prior Publication Data

US 2003/0188574 A1 Oct. 9, 2003

Related U.S. Application Data

(60) Provisional application No. 60/369,918, filed on Apr. 4, 2002, and provisional application No. 60/370,176, filed on Apr. 5, 2002.

(51) Int. Cl.$^7$ .............................................. G01M 17/02
(52) U.S. Cl. ........................................................ 73/146
(58) Field of Search .............................. 73/146, 146.2, 73/146.3, 146.4, 146.5, 146.8

(56) References Cited

U.S. PATENT DOCUMENTS

| | | |
|---|---|---|
| 1,779,907 A | 10/1930 | Dye |
| 2,345,679 A | 4/1944 | Linse |
| 2,378,237 A | 6/1945 | Morris |
| 2,503,992 A | 4/1950 | Becker |
| 2,612,772 A | 10/1952 | McConnell |
| 2,753,521 A | 7/1956 | Abrams |
| 2,940,305 A | 6/1960 | Williams |
| 2,941,144 A | 6/1960 | Cannon |
| 3,056,286 A | 10/1962 | Gibson |
| 3,148,535 A | 9/1964 | Lemelson |
| 3,228,232 A | 1/1966 | Proctor |
| 3,238,767 A | 3/1966 | Clynes |
| 3,285,059 A | 11/1966 | Bogle |
| 3,336,794 A | 8/1967 | Wysoczanski |
| 3,350,924 A | 11/1967 | King |
| 3,354,700 A | 11/1967 | Schindler |
| 3,367,173 A | 2/1968 | Uphoff |
| 3,371,524 A | 3/1968 | Wloszek |
| 3,384,733 A | 5/1968 | Burbank |
| 3,456,495 A | 7/1969 | Stinger |
| 3,465,242 A | 9/1969 | Gruetzmacher |
| 3,552,190 A | 1/1971 | Lefebyre |

(Continued)

Primary Examiner—Edward Lefkowitz
Assistant Examiner—Andre Allen
(74) Attorney, Agent, or Firm—Patterson, Thuents, Skaar & Christensen, P.A

(57) ABSTRACT

A testing head for a high voltage non-destructive tire testing apparatus that is positionable inside the carcass of a tire to be tested without spreading the beads of the tire. The testing head includes a horseshoe shaped body portion with a pair of depending legs. An electrode is operably coupled at the end of each leg. One of the electrodes is attached to a high-voltage power source and the other electrode is attached to electrical ground. Each electrode may be attached off-center from the center of gravity of the electrode so that the electrode is positioned at an angle with the leg to which it is attached when the testing head is suspended by the body portion and the electrodes are not in contact with a tire or other surface. When the electrodes are brought into contact with the inner surface of the tire carcass, the electrodes rotate into a testing orientation wherein each electrode is substantially perpendicular with the leg to which it is attached. The tire carcass is rotated, so that a portion of the electrodes slide over the inner surface of the tire. The high voltage electrode inductively couples with steel belts in the tire carcass, thereby causing the steel belts to have an elevated electrical potential relative to ground potential. When either electrode passes over a flaw in the tire, an arc passes through the flaw between the steel belt and the electrode closest to the flaw.

34 Claims, 6 Drawing Sheets

U.S. PATENT DOCUMENTS

| | | |
|---|---|---|
| 3,555,889 A | 1/1971 | Weighart |
| 3,576,126 A | 4/1971 | Weighart |
| 3,593,120 A | 7/1971 | Mandula |
| 3,604,249 A | 9/1971 | Wilson |
| 3,631,849 A | 1/1972 | Norris |
| 3,646,805 A | 3/1972 | Walters |
| 3,665,754 A | 5/1972 | Krautkramer |
| 3,670,562 A | 6/1972 | Muto |
| 3,815,407 A | 6/1974 | Lavery |
| 3,871,210 A | 3/1975 | Himmler |
| 3,872,715 A | 3/1975 | Pittaro |
| 3,882,717 A | 5/1975 | McCauley |
| 3,918,025 A | 11/1975 | Koshikawa |
| 3,967,498 A | 7/1976 | Pezzillo |
| 3,978,712 A | 9/1976 | Cowan |
| 3,981,184 A | 9/1976 | Matay |
| 4,059,989 A | 11/1977 | Halsey |
| 4,065,958 A | 1/1978 | Krylova |
| 4,083,232 A | 4/1978 | Heyser |
| 4,088,028 A | 5/1978 | Hildebrandt |
| 4,089,225 A | 5/1978 | Kraska |
| 4,089,226 A | 5/1978 | Kraska |
| 4,117,733 A | 10/1978 | Gugel |
| 4,274,289 A | 6/1981 | Weiss |
| 4,279,157 A | 7/1981 | Schomberg |
| 4,285,235 A | 8/1981 | Dugger |
| 4,297,876 A * | 11/1981 | Weiss .................. 73/146 |
| 4,327,579 A * | 5/1982 | Weiss .................. 73/146 |
| 4,337,660 A | 7/1982 | Weiss |
| 4,365,514 A | 12/1982 | Ho |
| 4,372,366 A | 2/1983 | Dugger |
| 4,516,068 A | 5/1985 | Hawkinson |
| 4,520,307 A | 5/1985 | Weiss |
| 5,786,535 A * | 7/1998 | Takeuchi et al. .......... 73/624 |
| 6,050,136 A | 4/2000 | Hawkinson |
| 6,179,839 B1 * | 1/2001 | Weiss et al. ............ 606/69 |
| 6,304,090 B1 * | 10/2001 | Weiss .................. 324/558 |
| 6,600,326 B2 * | 7/2003 | Weiss .................. 324/558 |
| 6,604,421 B1 * | 8/2003 | Li .................... 73/636 |

* cited by examiner

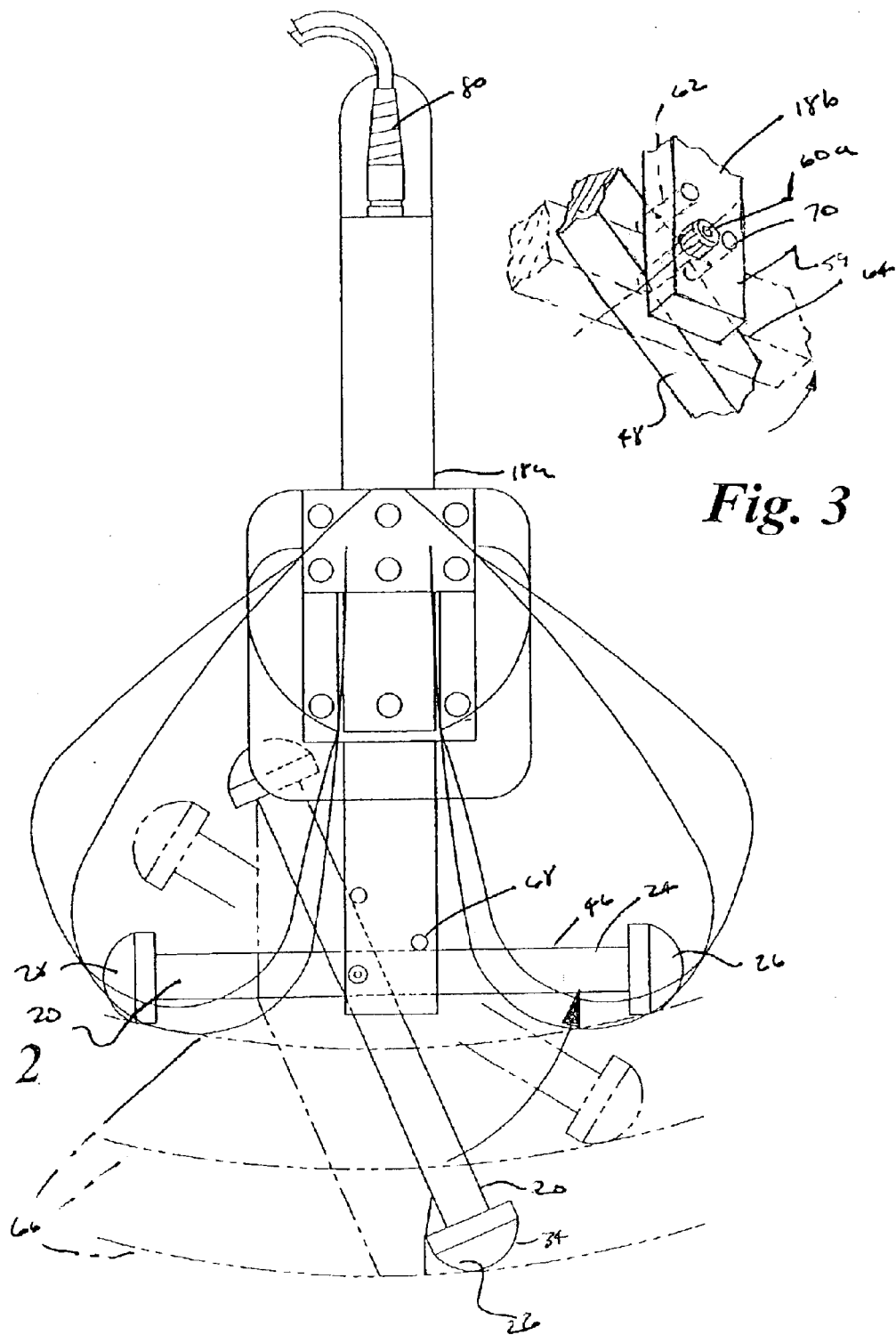

APPARATUS AND METHOD FOR ELECTRONIC TIRE TESTING

RELATED APPLICATIONS

This application claims benefit under 35 U.S.C. 119(e) of U.S. Provisional Patent Application Ser. No. 60/369,918 filed Apr. 4, 2002, and U.S. Provisional Patent Application Ser. No. 60/370,176 filed Apr. 5, 2002, both of which are hereby incorporated fully herein by reference.

FIELD OF THE INVENTION

The present invention relates to non-destructive testing of vehicular tires, and specifically to apparatus and methods for non-destructive testing of vehicular tires with high-potential electricity.

BACKGROUND OF THE INVENTION

It is common to retread worn vehicular tires so that the tires may be reused. Typically, a tire carcass is inspected prior to applying a new tread portion in order to detect any flaws in the carcass, such as a defect in the inner liner, that would make the carcass unsuitable for retreading.

Visual inspection of a tire carcass to detect flaws has been known for many years, and is typically employed as one part of the inspection before retreading. Visual inspection, however, while useful for detecting gross flaws in tire carcasses being evaluated for possible retreading, is not suited for reliably detecting certain flaws. In particular, flaws that involve a defect too fine or too obscure to detect visually may be inadvertently overlooked and retreaded to produce a defective retreaded tire.

Various testing devices and methods have been developed to supplement visual inspection methods during the tire retreading process. Some prior methods, such as disclosed in U.S. Pat. Nos. 4,297,876 and 4,327,579 each of which is fully incorporated herein by reference, involve the use of ultrasonic energy. Other methods, such as described in U.S. Pat. Nos. 6,304,090 and 4,520,307, which are owned by the owner of the present invention and which are also incorporated fully herein by reference, involve the use of high potential electrical energy.

In the method described in U.S. Pat. No. 6,304,090, a testing head that carries a high voltage is applied to the interior surfaces of a tire being tested. A corresponding grounding element, which may be part of a tire spreader or tire rotating device, is applied to the outside of the tire opposite the testing head. This grounding element is maintained at substantially ground potential. Flaws are detected by arcing between the testing head and the grounding element through the flaw.

Generally, with prior testing devices, if the testing head is made large enough to cover a significant area of the inner surface of the tire so that testing can be accomplished in one rotation of the tire, the beads of tire must be spread apart to enlarge the access opening to facilitate insertion of the testing head. Further, the beads of the testing head must be spread again for removal of the testing head. Special equipment may be required for spreading the beads of the tire, presenting an additional cost and requiring additional time for testing each tire.

Also, the testing head and the grounding element are generally positioned on opposite sides of the tread portion of the tire in prior devices. The inner liner, the reinforcing cords and the tread portion of the tire are all positioned in series between the testing head and the grounding element. Flexibility and ease of use of the equipment is limited, since the elements must be carefully maintained in position on the inside and outside of the tire. Also, relatively high electrical potentials are used in prior devices to overcome the impedance presented by such an arrangement, resulting in costly equipment components. Even with such higher potentials, smaller defects may sometimes go undetected.

There is a need in the industry for an electrical tire testing system that overcomes the above identified issues presented by prior art devices and methods.

SUMMARY OF THE INVENTION

The present invention substantially meets the aforementioned need of the industry. The invention includes a testing head for a high voltage non-destructive tire testing apparatus that is positionable inside the carcass of a tire to be tested without spreading the beads of the tire. The testing head includes a horseshoe shaped body portion with a pair of depending legs. An electrode is operably coupled at the end of each leg. One of the electrodes is attached to a high-voltage power source and the other electrode is attached to electrical ground. Each electrode may be attached off-center from the center of gravity of the electrode so that the electrode is positioned at an angle with the leg to which it is attached when the testing head is suspended by the body portion and the electrodes are not in contact with a tire or other surface. In this positioning orientation, the electrodes may be inserted between the beads of a tire without spreading the beads.

When the electrodes are brought into contact with the inner surface of the tire carcass, the electrodes rotate into a testing orientation wherein each electrode is substantially perpendicular with the leg to which it is attached. The tire carcass is rotated, so that a portion of the electrodes slide over the inner surface of the tire. The high voltage electrode inductively couples with steel belts in the tire carcass, thereby causing the steel belts to have an elevated electrical potential relative to ground potential. When either electrode passes over a flaw in the tire, an arc passes through the flaw between the steel belt and the electrode closest to the flaw.

With the unique positioning aspects of the electrodes described above, the need to spread the beads of a tire carcass for insertion of the test head is eliminated, thus greatly increasing efficiency and saving time in the testing process.

Also, the positioning of both electrodes inside the tire with the high-voltage electrode inductively coupled with a steel belt in the tire, eliminates the need for a separate grounding element that must be positioned on the outside of the tire in close proximity to a high voltage head on the inside of the tire. Equipment costs are correspondingly reduced. In addition, the decreased impedance resulting from only the inner liner portion of the tire being disposed between the steel belt and each electrode enables a lower potential to be used for the high voltage head, thus saving costs, while also providing the same or improved detection performance for smaller flaws. Moreover, since both electrodes are positioned inside the tire, no contact with the outside tread portion of the tire is required, thereby reducing the possibility of contamination if the tread portion of the tire has been buffed.

Accordingly, the invention includes apparatus for non-destructively testing a vehicular tire, the tire having a carcass with a pair of opposing sidewalls, an inner surface, and at least one integral steel belt portion, and presenting a rotational axis. The apparatus generally includes high-potential electrical power source, and a detecting head portion. The detecting head portion includes a body portion made from electrically insulating material, a first elongate electrode operably coupled with the body portion and operably electrically connected with the high-potential power source, and a second elongate electrode operably coupled with the body portion and spaced apart from the first electrode portion, the second electrode being operably electrically connected with an electrical ground potential source. Each of the first and second electrodes have at least one portion adapted to be contactable with the inner surface of the tire carcass and to be slidable thereon as the tire is rotated about the rotational axis, so that as either electrode is passed over a flaw in the tire carcass, an electrical arc occurs through the flaw between the steel belt portion and the electrode nearest the flaw.

The body portion may be generally arcuate or horseshoe shaped with a pair of depending opposing leg portions, each leg portion having an end. Each of the first and second electrodes is operably coupled at the end of a separate one of the legs. Each of the first and second electrodes presents a longitudinal axis, and is selectively rotatably positionable between at least a positioning orientation wherein the longitudinal axis is positioned at an acute angle relative to the leg portion, and a testing orientation wherein the longitudinal axis is generally perpendicular relative to the leg portion.

Each of the first and second electrodes may define a center of gravity, and have a first and second end adapted to engage the inner surface of the tire carcass. The electrodes may be operably coupled to a separate one of the legs of the body portion at a point along the electrode between the center of gravity of the electrode and one of the pair of opposing ends of the electrode, so that each of the first and second electrodes is positioned in the positioning orientation by gravity when the detecting head is positioned so that the legs are oriented downwardly and the first and second electrodes are not engaged with the tire carcass. The first and second electrodes may rotate in opposite directions when the electrodes are positioned between the positioning orientation and the testing orientation.

The invention may also include a method of detecting flaws in a vehicular tire having a carcass with an inner surface and at least one integral steel belt, wherein the tire presents a rotational axis. The method includes steps of coupling first and second electrodes to an electrically insulating body member so that the electrodes are spaced apart on the body member, connecting the first electrode with a high voltage power source, connecting the second electrode with electrical ground potential, and disposing the first and second electrodes in the carcass with at least a portion of each electrode in contact with the inner surface, the electrodes being slidable thereon. The carcass is then rotated about the rotational axis, thereby moving the electrodes over the surface of the inner surface so that as either electrode is passed over a defect in the inner surface, an electrical arc occurs through the defect between the steel belt portion and the electrode nearest the defect.

BRIEF DESCRIPTION OF THE DRAWINGS

FIG. 2 is an end elevation view of the detecting head depicted in FIG. 1, depicting the electrode in various rotational positions;

FIG. 3 is an enlarged perspective view of the rotational connection between the high voltage electrode and the body portion of the testing head;

DETAILED DESCRIPTION OF THE PREFERRED EMBODIMENTS

Figure 1:
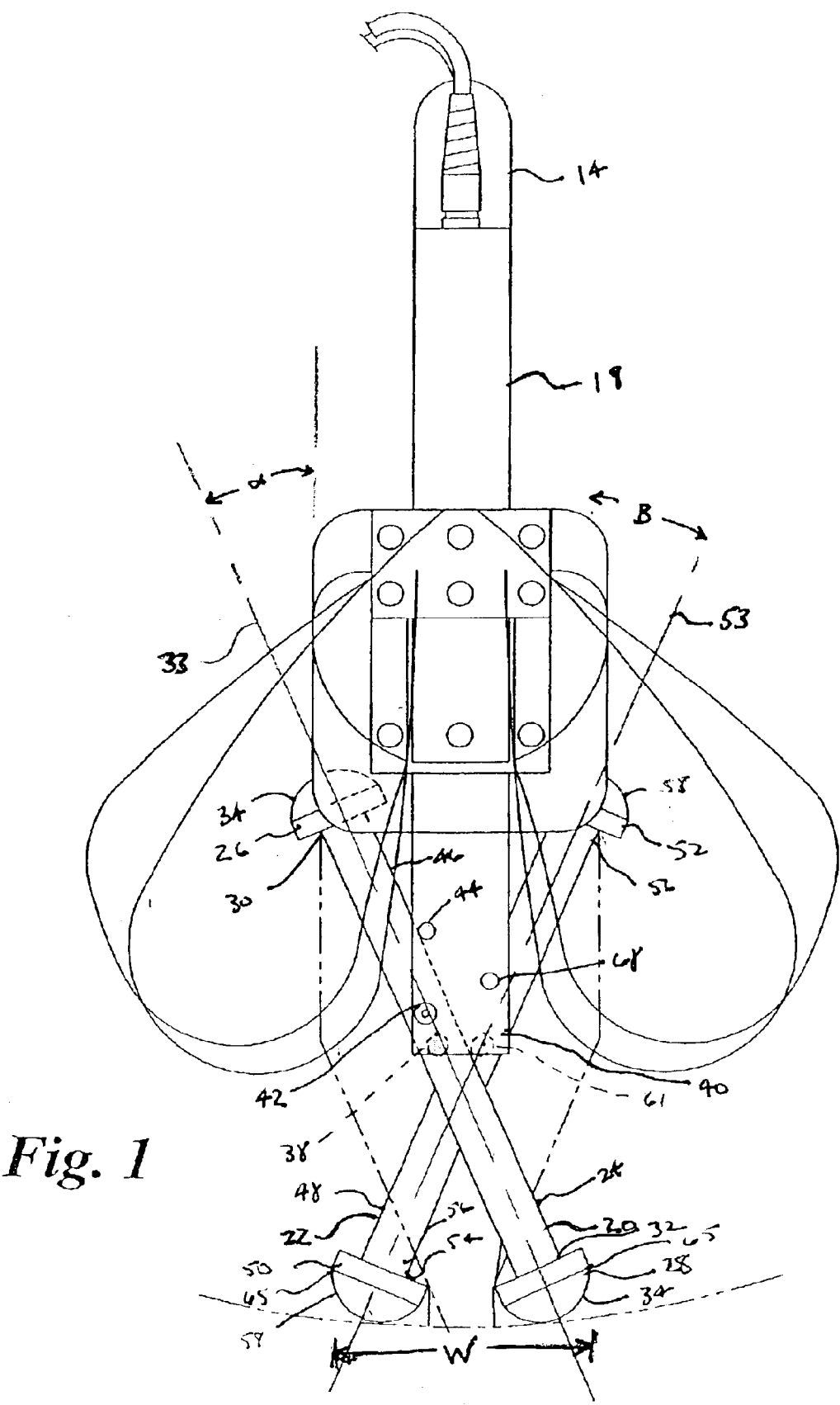
FIG. 1 is an end elevation view of a detecting head according to the present invention wherein the electrodes are positioned in a positioning orientation.

Tire testing apparatus 10 generally includes high-potential electrical power source 12 and testing head 14. High potential electrical power source 12 may be a voltage generator used to generate a high voltage, such that the electric arcs produced upon detection of a flaw are visible to a human eye. In one embodiment the high potential electrical power source 12 may produce a voltage of approximately 40,000 volts. In other embodiments, voltages of from 20,000 to 60,000 volts may be used. Any voltage, including those within and outside the range of the voltages listed herein, may be used within the scope of the tire test apparatus 10 of the invention. The high potential electrical power source 12 shown in FIG. 7 may be contained within a box with wheels 16 such that it may be easily moved in a tire retread shop to different areas. U.S. Pat. Nos. 4,520,307 and 6,304,090 each disclose high potential electrical power sources 12 that may be suitable for use with the invention. Other voltage generators, and in particular other high voltage generators, may also be used within the scope of the invention.

Testing head 14 generally includes a generally arcuate or horseshoe shaped body portion 18, having a pair of depending legs 18a, 18b, a high voltage electrode 20 and a grounding electrode 22. Body portion 18 is preferably made from an electrically insulative material, such as non-conductive plastic.

High voltage electrode 20 generally includes an elongate bar portion 24 made from an electrically conductive material, and a pair of wheels 26, 28, rotatably mounted on the ends 30, 32, of bar portion 24. The bar portion 24 presents a longitudinal axis 33. Each wheel 26, 28, may have a rounded outer surface portion 34 for engaging an inner surface of a tire carcass as will be described in further detail hereinbelow. Each wheel 26, 28, may be attached to the respective ends 30, 32, through a bearing (not depicted) disposed in inner portion 36 of the wheel 26, 28.

Figure 7:
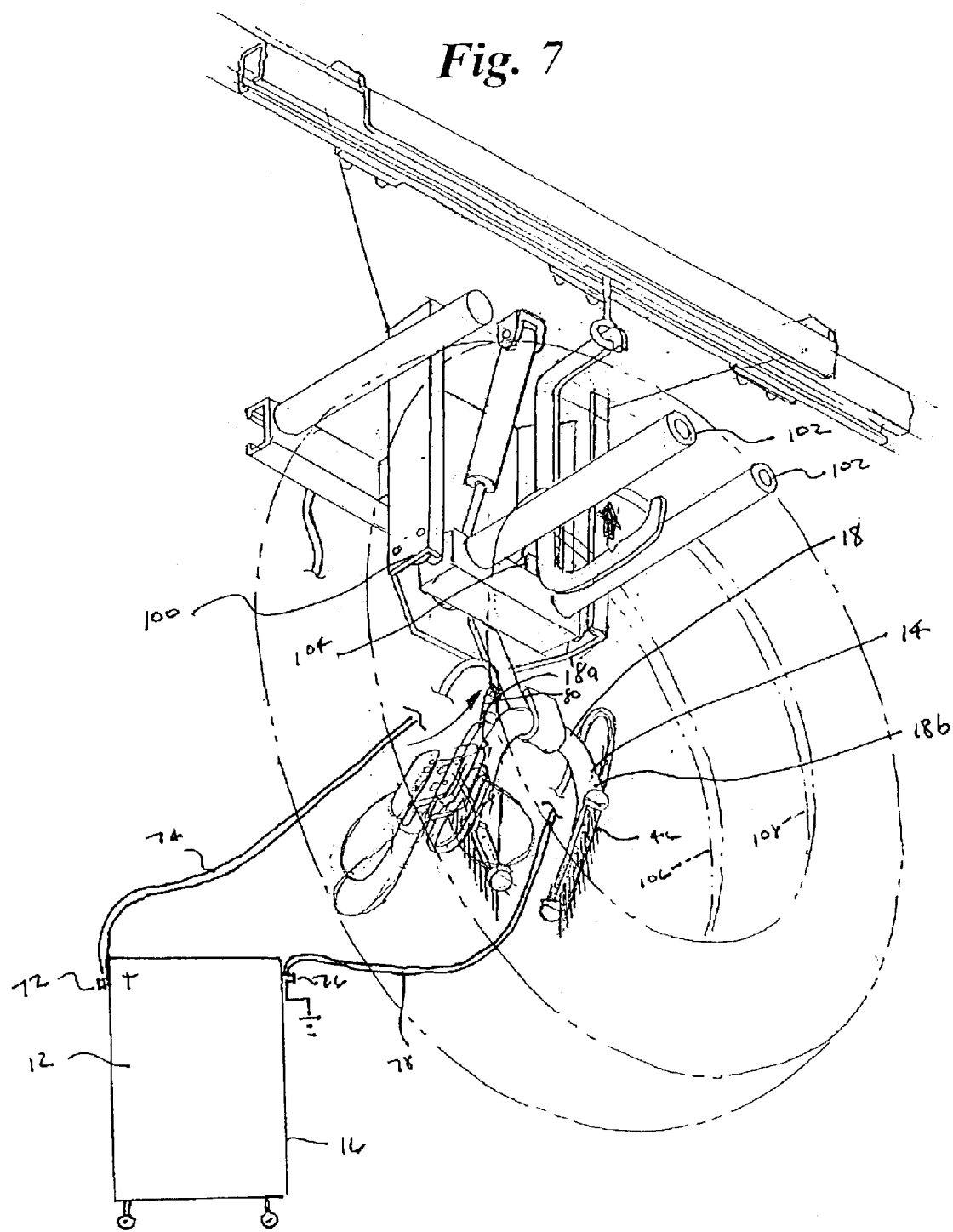
FIG. 7 is a perspective view of a testing head according to the present invention with apparatus for rotating a tire and with a tire carcass depicted in phantom.

Center of gravity 38 of high voltage electrode 20 is substantially centered on bar portion 24. Electrode 20 is pivotally attached to end 40 of leg 18a of body portion 18 at pivot 42. Pivot 42 is positioned between center of gravity 38 and wheel 26 so that high voltage electrode 20 is attached slightly off-center on bar portion 24. As a result, when testing head 14 is supported by body portion 18 as depicted in FIG. 7, electrode 20 is pivoted fully clockwise about pivot 42 as depicted in the view of FIG. 1, so that end 32 with wheel 28 depends downwardly and longitudinal axis 33 forms an acute angle, annotated α. in the drawings, with leg portion 18a. Currently, it is most preferred that angle α be less than about 45 degrees. Stop pin 44 projects from body portion 18 so as to engage the outer surface 46 of bar portion 24, thus preventing further clockwise rotation of electrode 20 in this position.

Grounding electrode 22 generally includes an elongate bar portion 48 made from an electrically conductive material, and a pair of wheels 50, 52, rotatably mounted on the ends 54, 56, of bar portion 48. Each wheel 50, 52, may have a rounded outer surface portion 58. The bar portion 48 presents a longitudinal axis 53. Again, each wheel 50, 52, may be attached to the respective ends 30, 32, through a bearing (not depicted) disposed in inner portion 60 of the wheel 50, 52.

Grounding electrode 22 is pivotally attached to end 59 of leg 18b at pivot 60a as depicted in FIG. 3. Pivot 60a is positioned between the center of gravity 61 of grounding electrode 22 and wheel 52 so that grounding electrode 22 is attached slightly off-center on bar portion 48. As a result, when testing head 14 is supported by body portion 18 as depicted in FIG. 7, electrode 22 is pivoted fully counter-clockwise about pivot 60a as depicted in the view of FIG. 1, so that end 56 with wheel 50 depends downwardly and longitudinal axis 53 forms an acute angle, annotated β in the drawings, with leg portion 18b. Currently, it is most preferred that angle β be less than about 45 degrees and substantially equal to angle α. Stop pin 62 projects from body portion 18 so as to engage the outer surface 64 of bar portion 48, thus preventing further counter-clockwise rotation of electrode 22 in this position.

With electrodes 20 and 22 angled with respect to the legs 18a, 18b, of the body portion 18 as described above, the electrodes 20 and 22 individually and the testing head 14 are configured in a positioning configuration. The angled positioning of electrodes 20 and 22 enables the electrodes 20 and 22 to be positioned between the beads of a tire carcass with requiring the beads to be spread. Also, with each of the electrodes 20, 22, in the fully downwardly depending position described above and resting against stop pins 44, 62, as depicted in FIG. 1, the outer edges 65 of wheels 28, 50, are spaced apart by a distance, annotated W in the drawings. It is most preferable that the length of electrodes 20, 22, and the relative positioning of stop pins 44, 62, be selected so that distance W is less than the distance between the beads of a tire carcass to be tested.

As depicted in FIG. 2, when testing head 14 is moved toward a surface 66, rounded outer surface portion 34 of wheel 26 contacts the surface 66. Electrode 20 pivots counter-clockwise as viewed from the perspective of FIG. 2, until electrode 20 is oriented generally perpendicular with leg portion 18a. Stop pin 68 projects from body portion 18 so as to engage the outer surface 46 of bar portion 24, thus preventing further counter-clockwise rotation of electrode 20 in the perpendicular position.

Grounding electrode 22 pivots simultaneously with electrode 20, as the outer surface portion 34 of wheel 50 contacts surface 66, except that grounding electrode 22 pivots clockwise, opposite from the direction of rotation of electrode 20. When grounding electrode 22 is oriented generally perpendicular with leg portion 18b, outer surface 64 engages stop pin 70, thus preventing further clockwise rotation of grounding electrode 22 from the perpendicular position.

Figure 5:
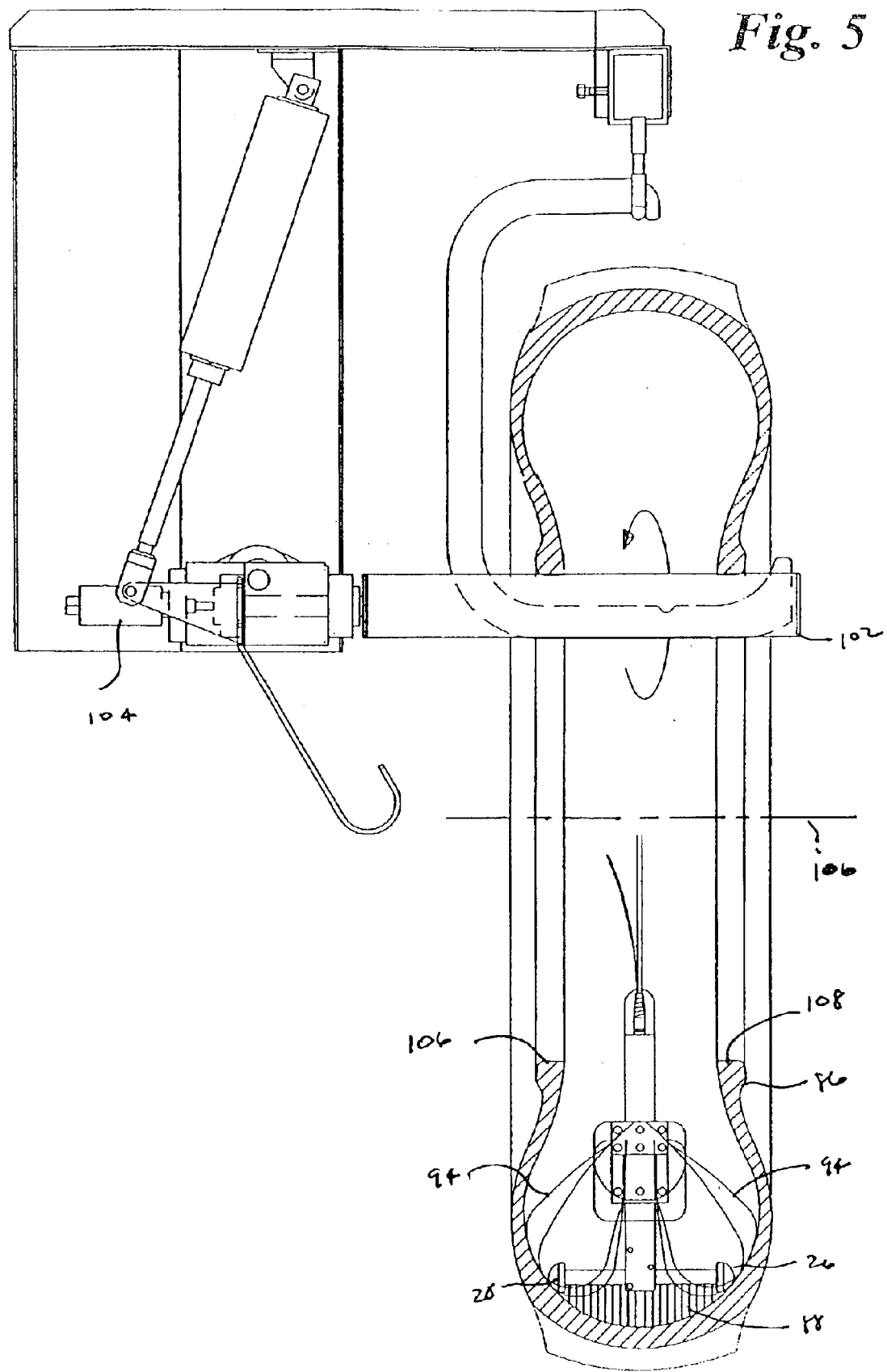
FIG. 5 is a partial cross sectional view of a tire carcass positioned on tire rotating apparatus and the with the testing head positioned in the tire carcass in the testing orientation.

With electrodes 20 and 22 perpendicular with respect to the legs 18a, 18b, of the body portion 18 as described above, the electrodes 20 and 22 individually and the testing head 14 are configured in a testing configuration. In the testing configuration, electrodes 20 and 22 are positioned laterally across the inside of the tire so as to substantially cover the inner surface of the tire carcass between the sidewalls as depicted in FIGS. 5 and 6.

As depicted in FIG. 7, high voltage electrode 20 is connected with the high voltage output 72 of high potential electrical power source 12 with wire 74. Grounding electrode 22 is connected with a terminal 76 substantially at electrical ground potential relative to high voltage output 72 with wire 78. Each depending leg 18a, 18b, of body portion 18 may be hollow so that wires 74, 78, may be routed therethrough for protection from damage and to keep them from interfering with positioning of the testing head 14. Flexible grommets 80 may be used to hold and protect each wire 74, 78, at the entry to body portion 18.

It will be appreciated that electrodes 20, 22, are spaced apart by virtue of being attached to opposite depending legs 18a, 18b, of body portion 18. The spacing of depending legs 18a, 18b, may be selected to enable insertion of the electrodes in a tire carcass while also being sufficient to prevent arc over or other interference between the electrodes.

Figure 6:
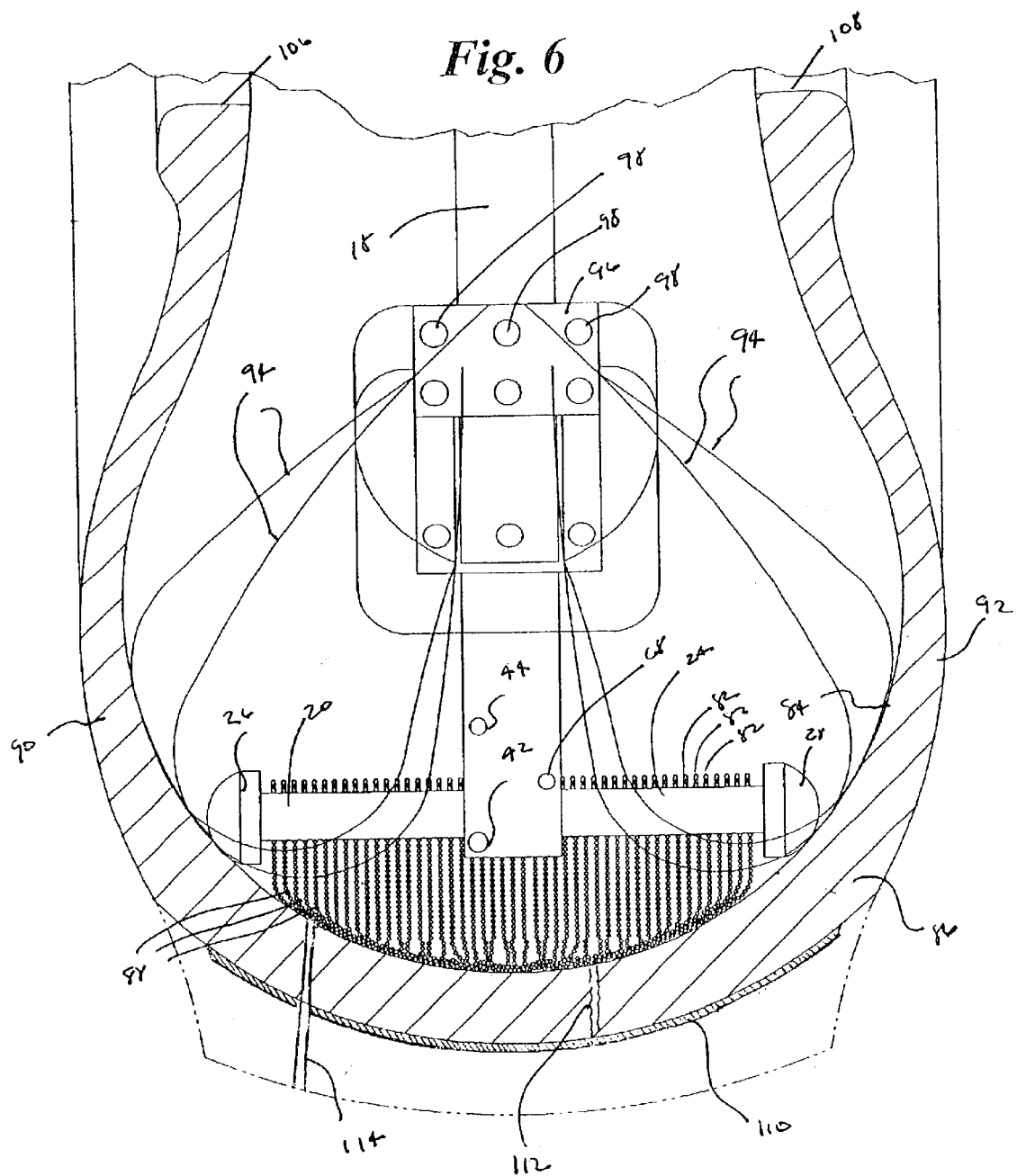
FIG. 6 is an enlarged view of a portion of the view of FIG. 5.

Either or both electrodes 20, 22, may have at least one probe or pin 82 for contacting the inner liner portion 84 of a tire carcass 86 as depicted in FIG. 6. Pins 82 may be made from any electrically conductive material, and may be flexible chains 88 as depicted, or may be any other structure such as a pin, wire, brush, or other conductive structure suitable for creating an electric field near the inner liner 84 of the tire carcass 86 to be tested.

In the depicted embodiment, chains 88 may be spaced apart and staggered in a line or other suitable pattern along bar portions 24, 48, so as to cover a substantial portion of the inner liner 84 of tire carcass 86 between sidewall portions 90, 92. It is preferred that chains 88 be of sufficient length so as to contact and drag on the inner liner 84 as testing head 14 translates thereon.

One or more laterally projecting sweep structures which may be in the form of wire loops 94 may be attached to testing head 14, and arranged so as to contact sidewall portions 90, 92, when testing head 14 is disposed in the tire carcass. Each wire loop 94 is attached to depending leg 18a with a clamping structure 96 secured to the leg with fasteners 98. As depicted in FIGS. 4–7, wire loops 94 are connected with high voltage electrode 20 so that an electric field may be applied to the sidewall portions 90, 92, for detecting flaws therein. Similar wire loops 94 may be connected with grounding electrode 22 for the same purpose. Of course, it will be readily appreciated that other suitable conductive flexible structures positioned for contacting sidewall portions 90, 92, could be substituted for wire loops 94, and such alternative structures are contemplated within the scope of the present invention.

In FIGS. 4–7, testing head 14 is depicted in various stages of use with a tire rotating device 100. Tire rotating device 100 generally includes one or more rollers 102 connected with a rotary drive 104. Tire rotating device 100 is more fully described in co-pending application Ser. No. 10/407,613, entitled "Apparatus And Method For Tire Testing", commonly owned by the owner of the present invention, and fully incorporated herein by reference. Of course, as will be readily appreciated, any other type of suitable tire rotating device, such as those disclosed in U.S. Pat. Nos. 4,520,307 and 6,304,090 may also be used with the present invention.

Figure 4:
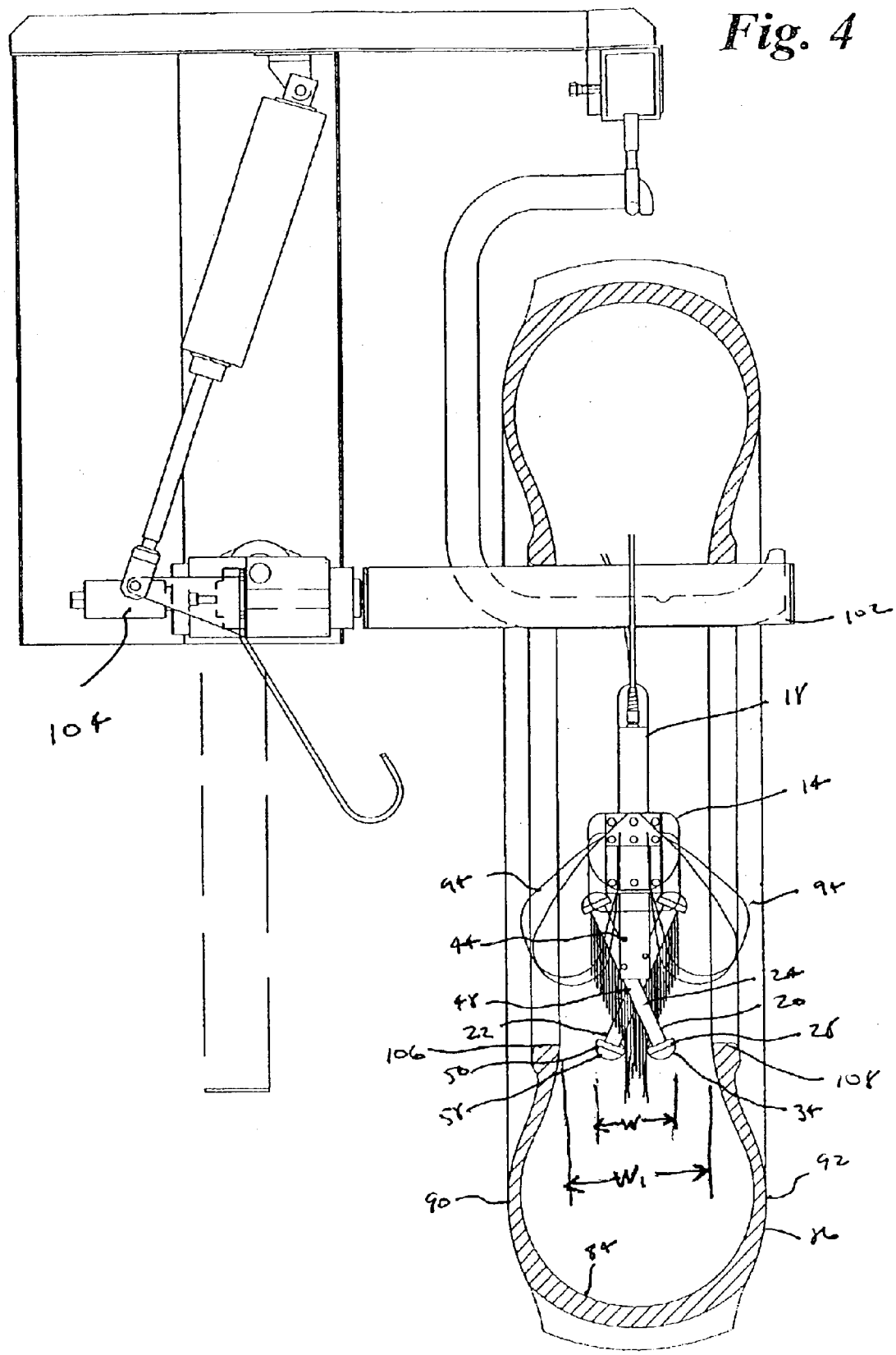
FIG. 4 is a partial cross sectional view of a tire carcass positioned on tire rotating apparatus and the with the testing head positioned for insertion in the tire carcass.

In operation, bead portions 106, 108, of tire carcass 86 are positioned on rollers 102 and testing head 14 is positioned between bead portions 106, 108, as depicted in FIG. 4. Testing head 14 is suspended by body portion 18 so that electrodes 20, 22, are positioned with wheels 28, 50, depending downwardly and bar portions 24, 48, contacting stop pins 44, 62. Bead portions 106, 108, are spaced apart by a distance, annotated $W_1$ in the drawings. Since distance W, which is the distance between the outer edges 65 of wheels 28, 50, when testing head 14 is oriented in the positioning configuration as previously described, is less than distance $W_1$, wheels 28, 50 fit between bead portions 106, 108, so that testing head 14 may be lowered into position inside tire carcass 86 as depicted in FIGS. 5–6.

As testing head 14 is lowered into position, the rounded outer surface portions 34, 58, of wheels 28, 50, contact inner liner 84 and slide laterally, thereby pivoting electrodes 20, 22, into the horizontal position with bar portions 24, 48 contacting stop pins 68, 70. In the horizontal position, both wheels 26, 28, of high voltage electrode 20 and both wheels 50, 52, of grounding electrode 22 are in contact with inner surface 84 of tire carcass 86. Wire loops 94 extend laterally to contact sidewall portions 90, 92. In this position, the testing head 14 is configured in a testing configuration. It is currently preferred that wire loops 94 be made from heavy gauge piano wire, but any other suitable material may also be used.

With testing head 14 positioned in tire carcass 86, high voltage is applied to high voltage electrode 20 with high potential electrical source 12, thereby creating an electrical field about high voltage electrode 20. Rotary drive 104 is used to rotate rollers 102, which in turn, cause tire carcass 86 to rotate about an axis 106 presented at the center of the tire carcass 86. As the tire carcass 86 rotates, testing head 14 rolls along the inner liner 84 of tire carcass 86 on wheels 26, 28, 50, 52. Chains 88 and wires 94 slide along the inner liner 84 and place the electrical field of high voltage electrode 20 is close proximity thereto. A certain amount of inductive coupling takes place between steel belt portion 110 of the tire carcass 86, thereby placing it at an elevated electrical potential with respect to grounding electrode 22. As either electrode 20, 22, rolls over a flaw, such as inner liner defect 112 or through hole 114, an arc passes through the flaw between the steel belt portion 110 and the electrode 20, 22, closest the flaw thereby indicating the presence of the flaw.

Once a complete rotation of tire carcass 86 has been made about axis 106, testing head 14 may be removed to prepare for testing another tire. When body portion 18 is lifted, electrodes 20, 22, pivot in opposite directions as the testing head 14 moves upward. Once the electrodes 20, 22, are in their downwardly depending position, wheels 28, 50, are positioned to clear bead portions 102, 104, and the testing head 14 may be lifted out of the tire carcass 86.

Of course, the testing head 14 of the present invention may also be used with conventional tire rotating machines wherein a grounded roller contacts and rolls against the outside of the tire to rotate the tire about the rotational axis. Examples of such conventional tire rotating machines are described in the patents incorporated by reference herein. In such embodiments, either one or both of the electrodes 20, 22, may be connected with the high-voltage electrical power source and the arcing will occur between the connected electrode in the tire and the grounded roller outside the tire. As before, the self-positioning electrode assemblies are positioned in the downwardly angled orientation by gravity, and are insertable inside the tire without spreading the beads of the tire. Once contacted with the inner surface of the tire, the electrodes rotatably shift into the testing position. As the tire is rotated by the outside roller, the testing head rolls along the inside of the tire, maintaining its position as it rolls, similar to the detecting head described in U.S. Pat. No. 6,304,090.

It will be appreciated that the present invention enables non-destructive testing of a tire for retreading without the need for a bead spreader. In addition, no exterior element is needed on the outside of the tire. Consequently, positioning and use of the testing head is greatly simplified. Also, since essentially only the inner liner portion of the tire is positioned between the high voltage and ground electrodes due to the inductive coupling with the steel belt of the tire, lower electrical potentials can be used while simultaneously achieving improved small defect detection efficiency.

What is claimed is:

1. Apparatus for non-destructively testing a vehicular tire, the tire having a carcass with a pair of opposing sidewalls, an inner surface, an outer surface, and at least one integral steel belt portion, the tire presenting a rotational axis, the apparatus comprising:

a high-potential electrical power source; and a detecting head portion including:

a body portion made from electrically insulating material;

a first elongate electrode operably coupled with the body portion and operably electrically connected with the high-potential power source; and a second elongate electrode operably coupled with the body portion and spaced apart from the first electrode portion, the second electrode operably electrically connected with an electrical ground potential source, wherein each of the first and second electrodes have at least one portion adapted to be contactable with the inner surface of the tire carcass and to be slidable thereon as the tire is rotated about the rotational axis, so that as either electrode is passed over a flaw in the tire carcass, an electrical arc occurs through the flaw between the steel belt portion and the electrode nearest the flaw, and wherein when said at least one portion of each of the first and second electrodes is contacted with the inner surface of the tire, no portion of either of the first and second electrodes contacts the outer surface of the tire.

2. The apparatus of claim 1, further comprising means for rotating the tire about the rotational axis.

3. The apparatus of claim 1, wherein said body portion is generally arcuate shaped with a pair of depending opposing leg portions, each leg portion having an end, and wherein each of said first and second electrodes is operably coupled at the end of a separate one of said legs.

4. The apparatus of claim 3, wherein each of the first and second electrodes presents a longitudinal axis, and wherein each of the first and second electrodes is selectively rotatably positionable between at least a positioning orientation wherein the longitudinal axis is positioned at an acute angle relative to the leg portion, and a testing orientation wherein the longitudinal axis is generally perpendicular relative to the leg portion.

5. The apparatus of claim 4, wherein each of the first and second electrodes defines a center of gravity, wherein each of the first and second electrodes have a first and second end adapted to engage the inner surface of the tire carcass, and wherein each of the first and second electrodes is operably coupled to a separate one of the legs of the body portion at a point along the electrode between the center of gravity of the electrode and one of the pair of opposing ends of the electrode, so that each of the first and second electrodes is positioned in the positioning orientation by gravity when the detecting head is positioned so that the legs are oriented downwardly and the first and second electrodes are not engaged with the tire carcass.

6. The apparatus of claim 4, wherein the first and second electrodes rotate in opposite directions when the electrodes are positioned between the positioning orientation and the testing orientation.

7. The apparatus of claim 6, wherein the positioning orientation and the testing orientation are each defined by a separate stop structure.

8. The apparatus of claim 1, wherein each of the first and second electrodes has a pair of opposing ends with a tire carcass engaging wheel operably rotatably coupled at each of the opposing ends.

9. The apparatus of claim 8, wherein each tire carcass engaging wheel has a rounded portion for engaging the tire carcass.

10. The apparatus of claim 1, wherein at least one of said first and second electrodes has a plurality of flexible contact elements arranged so as to drag on the inner surface when the tire carcass is rotated.

11. The apparatus of claim 1, wherein said body portion has a plurality of flexible sweep elements positioned so as to contact the sidewalls of the tire carcass when the first and second electrodes are positioned in contact with the inner surface.

12. A method of detecting flaws in a vehicular tire having a carcass with an inner surface, an outer surface, and at least one integral steel belt, the tire presenting a rotational axis, the method comprising steps of:
    coupling first and second electrodes to an electrically insulating body member so that the electrodes are spaced apart on the body member;
    connecting the first electrode with a high voltage power source;
    connecting the second electrode with electrical ground potential;
    disposing the first and second electrodes in the carcass with at least a portion of each electrode in contact with the inner surface and with no portion of either electrode contacting the outer surface of the tire, said electrodes being slidable thereon; and
    rotating the carcass about the rotational axis, thereby moving the electrodes over the surface of the inner surface so that as either electrode is passed over a defect in the inner surface, an electrical arc occurs through the defect between the steel belt portion and the electrode nearest the defect.

13. A detecting head for a non-destructive vehicular tire testing apparatus, the tire having a carcass with a pair of opposing sidewalls, an inner surface, an outer surface, and at least one integral steel belt portion, the tire presenting a rotational axis, the detecting head comprising:
    a body portion made from electrically insulating material;
    a first elongate electrode operably coupled with the body portion and adapted to be operably electrically connectable with a high-voltage power source; and
    a second elongate electrode operably coupled with the body portion and spaced apart from the first electrode portion, the second electrode adapted to be operably electrically connectable with an electrical ground potential source,
    wherein each of the first and second electrodes have at least one portion adapted to be contactable with the inner surface of the tire carcass without contacting the outer surface of the tire and to be slidable thereon as the tire is rotated about the rotational axis, so that as either electrode is passed over a defect in the inner surface, an electrical arc occurs through the defect between the steel belt portion and the electrode nearest the defect.

14. The apparatus of claim 13, wherein said body portion is generally arcuate shaped with a pair of depending opposing leg portions, each leg portion having an end, and wherein each of said first and second electrodes is operably coupled at the end of a separate one of said legs.

15. The apparatus of claim 14, wherein each of the first and second electrodes presents a longitudinal axis, and wherein each of the first and second electrodes is selectively rotatably positionable in at least a positioning orientation wherein the longitudinal axis is positioned at an acute angle relative to the leg portion, and a testing orientation wherein the longitudinal axis is generally perpendicular relative to the leg portion.

16. The apparatus of claim 15, wherein each of the first and second electrodes defines a center of gravity, wherein each of the first and second electrodes have a first and second end adapted to engage the inner surface of the tire carcass, and wherein each of the first and second electrodes is operably coupled to a separate one of the legs of the body portion at a point along the electrode between the center of gravity of the electrode and one of the pair of opposing ends of the electrode, so that each of the first and second electrodes is positioned in the positioning orientation by gravity when the detecting head is positioned so that the legs are oriented downwardly and the first and second electrodes are not engaged with the tire carcass.

17. The apparatus of claim 15, wherein the first and second electrodes rotate in opposite directions when the electrodes are positioned between the positioning orientation and the testing orientation.

18. The apparatus of claim 13, wherein each of the first and second electrodes has a pair of opposing ends with a tire carcass engaging wheel operably rotatably coupled at each of the opposing ends.

19. The apparatus of claim 18, wherein each tire carcass engaging wheel has a rounded portion for engaging the tire carcass.

20. The apparatus of claim 13, wherein at least one of said first and second electrodes has a plurality of flexible contact elements arranged so as to drag on the inner surface when the tire carcass is rotated.

21. The apparatus of claim 13, wherein said body portion has a plurality of flexible sweep elements positioned so as to contact the sidewalls of the tire carcass when the first and second electrodes are positioned in contact with the inner surface.

22. A detecting head for a non-destructive vehicular tire testing apparatus, the tire having a carcass with a pair of opposing sidewalls, an inner surface, and at least one integral steel belt portion, the detecting head comprising:
    a body portion made from electrically insulating material;
    first means on said body portion for slidably contacting a portion of the inner surface, said means adapted to be operably connected with a high potential electrical power source;
    second means on said body portion for slidably contacting a separate portion of the inner surface, said second means spaced apart from said first means, said second means adapted to be operably connected with electrical ground potential;
    wherein each of the first and second means are adapted to slide over the inner surface of the carcass as the tire is rotated about the rotational axis with no portion of either first or second means contacting the outer surface of the carcass so that as either means passes over a defect in the inner surface, an electrical arc occurs through the defect between the steel belt portion and the means nearest the defect.

23. The apparatus of claim 22, wherein said body portion is generally arcuate shaped with a pair of depending leg portions, each leg portion having an end, and wherein each of said first and second means is operably coupled at the end of a separate one of said legs.

24. The apparatus of claim 23, wherein said first means includes a first electrode and said second means includes a second electrode, each of said first and second electrodes pivotally attached to a separate one of said opposing ends of said body portion, each electrode presenting a longitudinal axis and being selectively rotatably positionable between at least a testing orientation wherein the longitudinal axis of the electrode is substantially perpendicular with the leg, and a positioning orientation wherein the longitudinal axis of the electrode forms an acute angle with the leg.

25. The apparatus of claim 24, wherein at least one of said first and second electrodes has a plurality of flexible contact elements arranged so as to drag on the inner surface when the tire carcass is rotated.

26. The apparatus of claim 24, wherein each of the first and second electrodes defines a center of gravity, wherein each of the first and second electrodes have a first and second end adapted to engage the inner surface of the tire carcass, and wherein each of the first and second electrodes is operably coupled to a separate one of the legs of the body portion at a point along the electrode between the center of gravity of the electrode and one of the pair of opposing ends of the electrode, so that each of the first and second electrodes is positioned in the positioning orientation by gravity when the detecting head is positioned so that the legs are oriented downwardly and the first and second electrodes are not engaged with the tire carcass.

27. The apparatus of claim 26, wherein the first and second electrodes rotate in opposite directions when the electrodes are positioned between the positioning orientation and the testing orientation.

28. The apparatus of claim 22, wherein each of the first and second electrodes has a pair of opposing ends with a tire carcass engaging wheel operably rotatably coupled at each of the opposing ends.

29. The apparatus of claim 28, wherein each tire carcass engaging wheel has a rounded portion for engaging and rolling against the sidewalls of the tire carcass when the tire carcass is rotated.

30. The apparatus of claim 22, wherein said body portion has a plurality of flexible sweep elements positioned so as to contact the sidewalls of the tire carcass when the first and second means are positioned in contact with the inner surface.

31. A detecting head for a non-destructive vehicular tire testing apparatus, the tire having a carcass with a pair of opposing sidewalls and an inner surface, each sidewall having a bead portion, the detecting head comprising:

a body portion having a pair of opposing ends; and a pair of elongate electrode assemblies, each assembly operably coupled to said body portion at a separate one of said opposing ends, wherein each assembly is self-positioning in a first downwardly angled orientation by gravity so that the assembly is insertable between the sidewalls of the tire without spreading the bead portions, and wherein each assembly is rotatably shiftable to a second substantially horizontal orientation by contacting the assembly with the inner surface of the tire.

32. The detecting head of claim 31, wherein the electrode assemblies rotate in opposite directions when shifted between said first and second orientations.

33. The detecting head of claim 31, wherein at least one of said electrode assemblies is operably electrically connected with a source of high-voltage electrical energy.

34. The detecting head of claim 31, wherein each electrode assembly includes an elongate body portion having a pair of opposing ends and a tire carcass engaging wheel operably rotatably coupled at each of the opposing ends.

* * * * *